(12) United States Patent
Brown et al.

(10) Patent No.: US 6,393,759 B1
(45) Date of Patent: May 28, 2002

(54) ELECTRONIC FLY TRAP APPARATUS WITH COVER (76) Inventors: Jeffrey K. Brown; Helena C. Brown, both of 4529 Acadia Cove, Niceville, FL (US) 32578

( * ) Notice: Subject to any disclaimer, the term of this patent is extended or adjusted under 35 U.S.C. 154(b) by 0 days.

(21) Appl. No.: 09/759,279

(22) Filed: Jan. 16, 2001

Related U.S. Application Data (60) Provisional application No. 60/177,196, filed on Jan. 21, 2000, and provisional application No. 60/232,604, filed on Sep. 14, 2000.

(51) Int. Cl.⁷ .................................................. A01M 1/04
(52) U.S. Cl. .......................................... 43/113; 43/114
(58) Field of Search ................... 43/113, 114

(56) References Cited

U.S. PATENT DOCUMENTS

| | | | | |
|---|---|---|---|---|
| 550,345 A | * | 11/1895 | Humphreys | 43/113 |
| 967,883 A | * | 8/1910 | Crabtree | 43/113 |
| 3,023,539 A | * | 3/1962 | Emerson, Jr. | 43/113 |
| 4,074,457 A | * | 2/1978 | Sato et al. | 43/113 |
| 4,117,624 A | * | 10/1978 | Phillips | 43/113 |
| 4,127,961 A | * | 12/1978 | Philips | 43/113 |
| 4,654,998 A | * | 4/1987 | Clay | 43/113 |
| 4,949,501 A | * | 8/1990 | Larkin | 43/113 |
| 5,231,790 A | * | 8/1993 | Dryden et al. | 43/113 |
| 5,251,397 A | * | 10/1993 | Exum et al. | 43/113 |
| 5,425,197 A | * | 6/1995 | Smith | 43/113 |
| 5,651,211 A | * | 7/1997 | Regan et al. | 43/113 |
| 5,915,948 A | * | 6/1999 | Kunze et al. | 43/113 |
| 5,950,355 A | * | 9/1999 | Gilbert | 43/113 |
| 5,974,727 A | * | 11/1999 | Gilbert | 43/113 |
| 6,108,965 A | * | 8/2000 | Burrows et al. | 43/113 |
| 6,108,966 A | * | 8/2000 | Otomo et al. | 43/113 |
| 6,327,810 B1 | * | 12/2001 | Howse | 43/114 |

FOREIGN PATENT DOCUMENTS

| | | | | |
|---|---|---|---|---|
| EP | 367539 B1 | * | 5/1990 | 43/113 |
| FR | 2428973 B1 | * | 2/1980 | 43/113 |
| GB | 2275409 B1 | * | 8/1994 | |
| WO | WO-92/20224 A1 | * | 11/1992 | |
| WO | WO-97/37532 A1 | * | 10/1997 | |

* cited by examiner

Primary Examiner—Darren W. Ark
(74) Attorney, Agent, or Firm—Rodger H. Flagg (57) ABSTRACT

An electronic fly trap apparatus having a housing with a cover placed over the top portion of the housing, and at least one flying insect access aperture extends through a portion of the cover. A light is positioned in the lower portion of the housing. A disposable sheet having a plurality of apertures therethrough is positioned on the housing above the source of light. A sticky adhesive is disposed upon the upper surface of the disposable sheet. Light and heat pass through the apertures in the disposable sheet into a space provided beneath the cover. A reflective panel is placed beneath the light to redirect primary light through the plurality of apertures. Flying insects pass into the apparatus through at least one access aperture, and are entrapped upon the sticky adhesive on the disposable sheet when they seek the source of the light.

20 Claims, 5 Drawing Sheets

ELECTRONIC FLY TRAP APPARATUS WITH COVER

This patent application claims priority of provisional patent applications 60/177,196 filed Jan. 21, 2000, entitled Electronic Flying Insect Entrapment Apparatus and 60/232, 604 filed Sep. 14, 2000, entitled Entrapment Apparatus for Flying Insects. This patent application further claims priority of utility patent application filed Jan. 3, 2001, entitled Electronic Fly Trap. Said prior provisional and utility patent applications are incorporated by reference herein.

FIELD OF THE INVENTION

This invention relates to electronic fly traps, and more particularly to tabletop electronic fly trap apparatus utilizing visible light to attract flying insects, such as flies, which enter an enclosure, and are entrapped upon a sticky surface as they approach a light source located beneath a disposable sheet having a plurality of apertures therethrough, the disposable sheet having with a sticky adhesive on the upper surface thereon.

BACKGROUND OF THE INVENTION

Flies breed and feed on filth. Flies spread pathogens that carry many diseases, such as Typhoid fever, Salmonella, dysentery, epidemic diarrhea and intestinal parasites. Each fly carries up to six million bacteria. Flies are attracted by sight, sound and scent to the source of light, vibrations and food. Flies are commonly found in restaurants, hospitals, nursing homes, planes, trains, cruise ships, retail food stores, and food processing facilities, wherever a source of food is found.

There are four principal ways in which files spread pathogens that cause disease.
1. Flies do not have chewing or biting mouth parts. A fly must regurgitate digestive enzymes onto its food. As the enzymes dissolve the food, the fly sucks up the nutrients through its feeding tube. The flies' mouth parts and enzymes contaminate the food.
2. Flies have setae or hairs all over their body parts. These hairs are involved in the sensory collection of stimuli. The hairs also collect bacteria and other microorganisms. The flies contaminate the surfaces on which they walk, and flies shed these contaminates as they fly. Contaminates from flying insects may remain airborne for hours.
3. Flies frequently evacuate their alimentary canal, leaving fly spots wherever they happen to land. These fly spots are unsightly and unsanitary.
4. Female flies lay eggs in food. The eggs become soft-bodied legless larva, or maggots, which feed on the food. Maggots are unsightly, unsanitary and spoil the food.

Many attempts have been made to eliminate flies in proximity to food and people, with mixed results. Attempts have been made to electrocute flies, in apparatus known generally as "bug zappers". These devices attract flies to a source of light, and electrically charged wires in proximity to the lights serve to electrocute the flies upon contact with the electrically charged wires. It has been found that electrocuted flies tend to explode, sending fly fragments in all directions. Thus, their use in proximity to food or people is not recommended, and these bug zappers are not recommended for use indoors. Field tests have shown that more than ninety percent of the flies killed by bug zappers are male flies. Thus, most female, egg laying flies are not killed by bug zappers.

The use of fly paper for catching flies is also well known. Flies are attracted to the area by sight, sound and/or smell, and become stuck on the fly paper, where they remain glued to the fly paper until the fly paper is removed. The efficiency of fly paper is limited to its size and location. Left in the open, fly paper is messy, unsightly, and difficult to handle without coming in contact with flies stuck on the glued surface.

Previous attempts have been made to attract flies with fluorescent lights, where they become stuck on fly paper located in proximity to the source of light. The fly paper is typically located behind or below the lights. While these devices are improvements on bug zappers and randomly placed fly paper, the light source and surrounding area quickly becomes spotted and contaminated in the presence of flies. Such devices are often difficult to clean and keep in good working order.

Silvandersson, a Swedish Company, has successfully marketed "the Window" fly trap, prior to 1992. This fly trap comprises a light transmissive sheet having an adhesive adhered to one surface. A backing sheet is removed to expose the adhesive prior to use. The fly trap is placed upon a window surface, and the flies are trapped by the adhesive as they attempt to find a passage-way through the window. Silvandersson's address is: Silvandersson Miijo AB, Box 56, SE-310 20 Knared.

U.S. Pat. No. 5,974,727 issuing to David Gilbert on Nov. 2, 1999 discloses a decorative flying insect trap using light, with fly paper located below the light.

U.S. Pat. No. 5,950,355 issuing to David Gilbert on Sep. 14, 1999 discloses a flying insect trap having a cardboard strip with adhesive located below the light source.

U.S. Pat. No. 5,651,211 issuing to Harold Regan et al. on Jul. 29, 1997, discloses a wall mounted trap for flies and insects, wherein the light is positioned above a sticky surface mounted on a rotatable cartridge.

U.S. Pat. No. 5,425,197 issuing to Colin Smith on Jun. 20, 1995 discloses a device for trapping insects having a light source which illuminates an adhesive surface which is continuously or intermittently rolled to avoid a build up of trapped insects.

U.S. Pat. No. 4,117,624 issuing to Dennis Phillips on Oct. 3, 1978 discloses an insect trap having a light source having a sticky substance located on a reflective surface positioned behind and below the light source.

U.S. Pat. No. 4,074,457 issuing to Hotoshi Sato et al on Feb. 21, 1978 discloses an insect catcher having a fluorescent lamp and vertically aligned sticky band located below the light source.

SUMMARY OF THE INVENTION

Thus, what is needed, is an efficient, attractive electronic fly trap apparatus, which is placed on a suitable horizontal surface, such as a table or a countertop. The apparatus should be easy to maintain and clean. It has an electronic light source. A disposable sheet is provided with a plurality of apertures therethrough. The upper surface of the disposable sheet is substantially covered with a sticky adhesive. The disposable sheet is located above the light source. The plurality of apertures in the disposable sheet allow heat and light to pass therethrough. The plurality of apertures are sized to restrict the passage of flies and most other flying insects. Preferably, the disposable sheet is a light transmissive disposable sheet.

A reflective panel is located beneath the light source to redirect the light through the plurality of apertures in the disposable sheet. Where the disposable sheet is a light transmissive disposable sheet, the light from the light source is also directed through the disposable sheet and the sticky adhesive. A translucent cover having a raised top portion and depending side portions forms a space therebetween. The translucent cover is located above the disposable sheet. The cover may be removable, or secured to the housing. An upwardly curved access aperture provides access to flies and other flying insects into the space provided beneath the cover. The flies are drawn into the space provided by the light emitted through the translucent cover, and by the warmth and light generated by the light source. The disposable sheet is preferably light transmissive. A sticky adhesive is mounted on the upper surface of the disposable sheet. The adhesive surface captures flies, and other flying insects, which land on the adhesive surface as they are drawn towards the source of the light. The cover is either secured to the housing or removable from the housing, and the upwardly curved access aperture is sized to slidably receive the disposable panel therein. The light passing through the plurality of apertures in the disposable sheet also passes through the translucent cover, and through at least one aperture located adjacent to the depending sides of the cover, to attract flying insects into the housing.

Other objectives and advantages of this invention will become apparent from the following description taken in conjunction with the accompanying drawings wherein certain example embodiments are set fourth by way of illustration in the accompanying drawings and description provided herein. The various features of novelty, which characterize this invention, are pointed out with particularity in the claims annexed to and forming a part of this disclosure.

BRIEF DESCRIPTION OF THE DRAWINGS

The invention will be better understood and objects and advantages will become apparent when consideration is given to the following detailed description thereof, which makes reference to the annexed drawings, wherein.

Please note that the same reference numerals refer to the same component parts throughout the various figures.

DESCRIPTION OF THE PREFERRED EMBODIMENT

With reference to the drawings, FIG. 1 through FIG. 8, the electronic fly trap apparatus 10, comprises a housing 12, having a bottom side 14, a first side 16, a top side 18, a second side 20, a third side 22, and a fourth side 24. Preferably, an external lip 26 extends on opposing sides of the housing 12, adjacent to the open top side 18.

Figure 2:
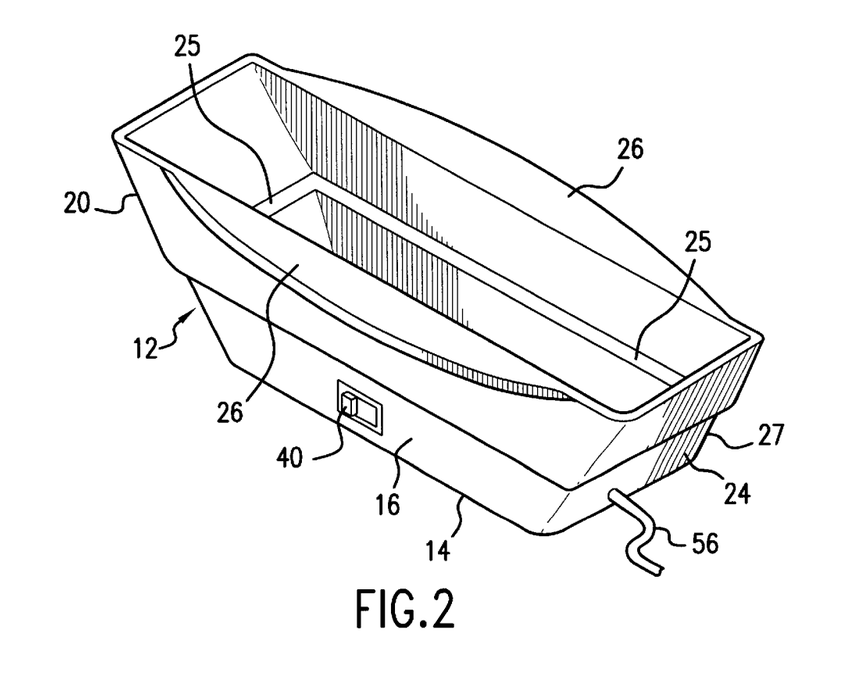
FIG. 2 is a perspective view of the electronic fly trap apparatus housing.

As best shown in FIG. 2, the top side 18 of the housing 12 includes opposing ledges 25 extending from opposing sides 16, 22 or opposing ends 20, 24 of the housing 12, adjacent to the top side 18 of the housing. The opposing ledges 25 are positioned to receive a disposable sheet 60 thereon. The disposable sheet 60 has a sticky adhesive 62 substantially covering the upper surface 63 of the disposable sheet 60. The sticky adhesive 62 is preferably as light transmissive sticky adhesive 62.

Figure 1:
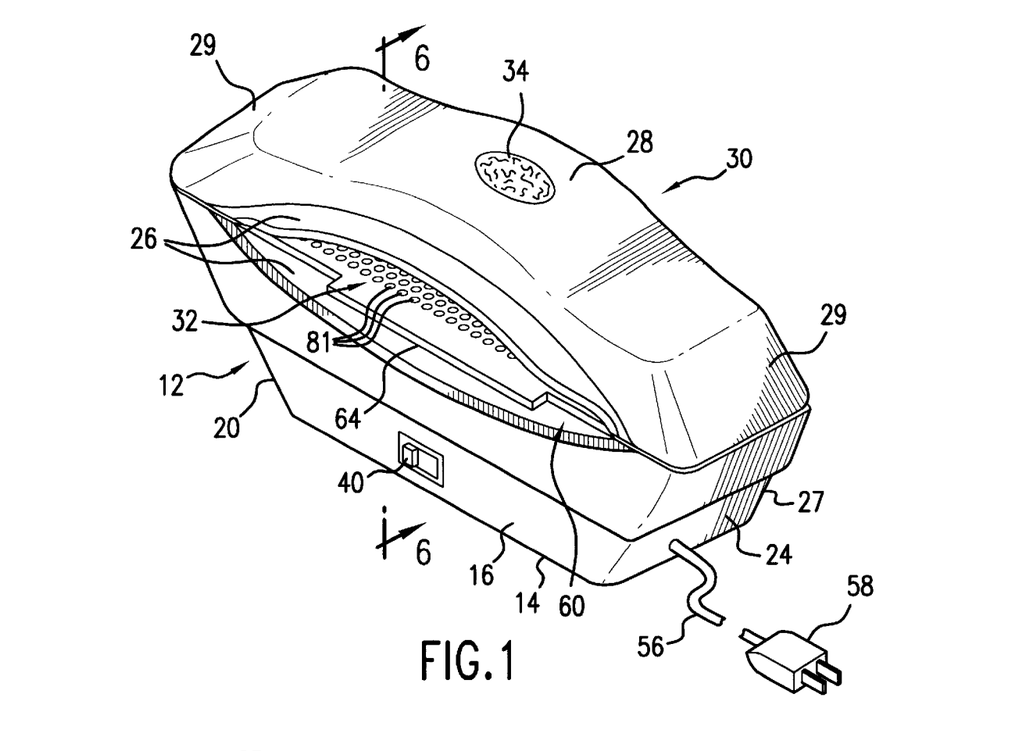
FIG. 1 is a perspective view of the electronic fly trap apparatus, shown with the cover secured to the housing.

Referring now to FIG. 1, a cover 30 includes a raised top portion 28 and spaced depending side portions 29, forming an enclosed space 31 therebetween. The cover 30 is preferably translucent to allow diffused light to pass therethrough. At least one upwardly curved access aperture 32 is provided between at least one of the depending side portions, and the top side 18 of the housing 12. The cover 30 may be secured to the housing 12 by any known means, such as with glue; light, heat or vibration bonding, fasteners, snap-together fastening, etc. The electronic fly trap apparatus disclosed herein, may be a disposable unit, which is discarded when the light fails. A fluorescent light will typically last one to two years under these conditions. Alternately, the cover may be removable to gain access to the components located within the housing.

Figure 6:
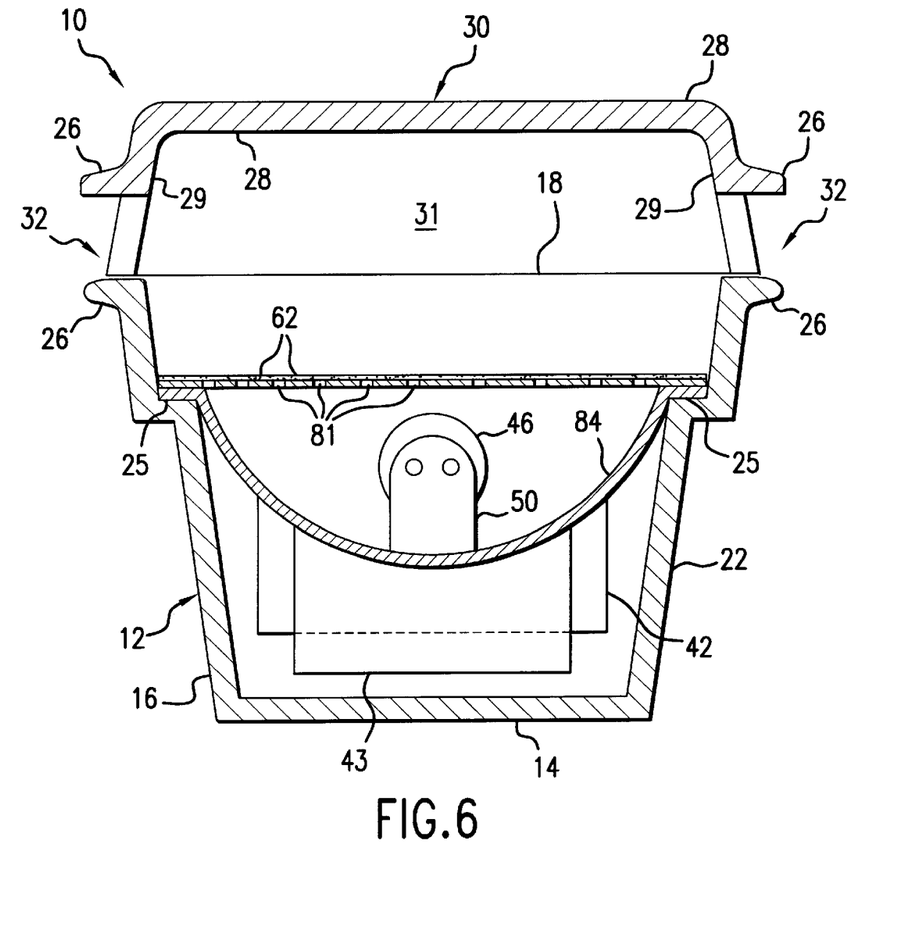
FIG. 6 is a cross sectional view of the fly trap apparatus taken along lines 6—6 in FIG. 1.
Figure 7:
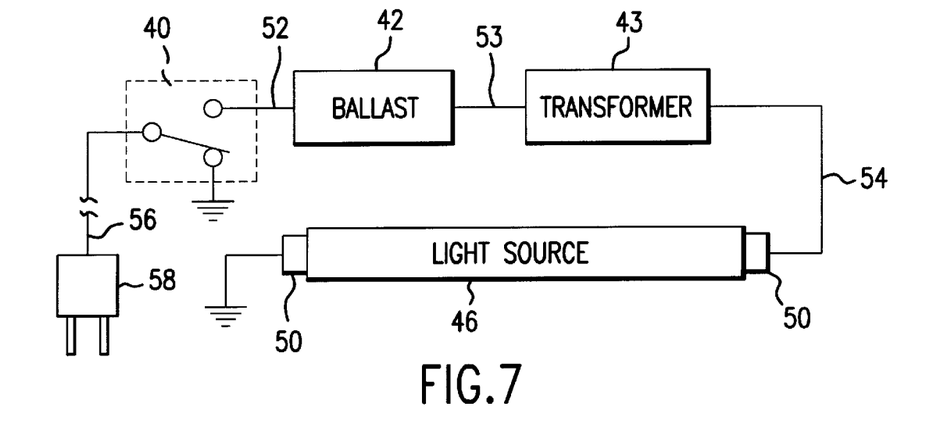
FIG. 7 is a schematic diagram showing the interrelationship of the electronic components of this invention.

Preferably, an external lip 26 extends both above and below the access aperture 32, as shown in FIG. 6. Two access aperture(s) 32 are shown in FIG. 6. Said access aperture(s) 32 is sized to provide access to flying insects, such as flies (not shown) into the enclosed space 31 provided within the cover 30. The access aperture(s) 32 is preferably upwardly curved as shown in FIG. 1, and sized to allow the disposable sheet 60 to be slidably received therethrough. The upwardly curved access aperture(s) 32 provides access into the housing 12, and further serves to direct light from beneath the removable cover 30 into the surrounding environment in order to attract flying insects.

The user is restricted from access to the light source 46, the transformer and the ballast, while the cover 30 is in place.

Figure 8:
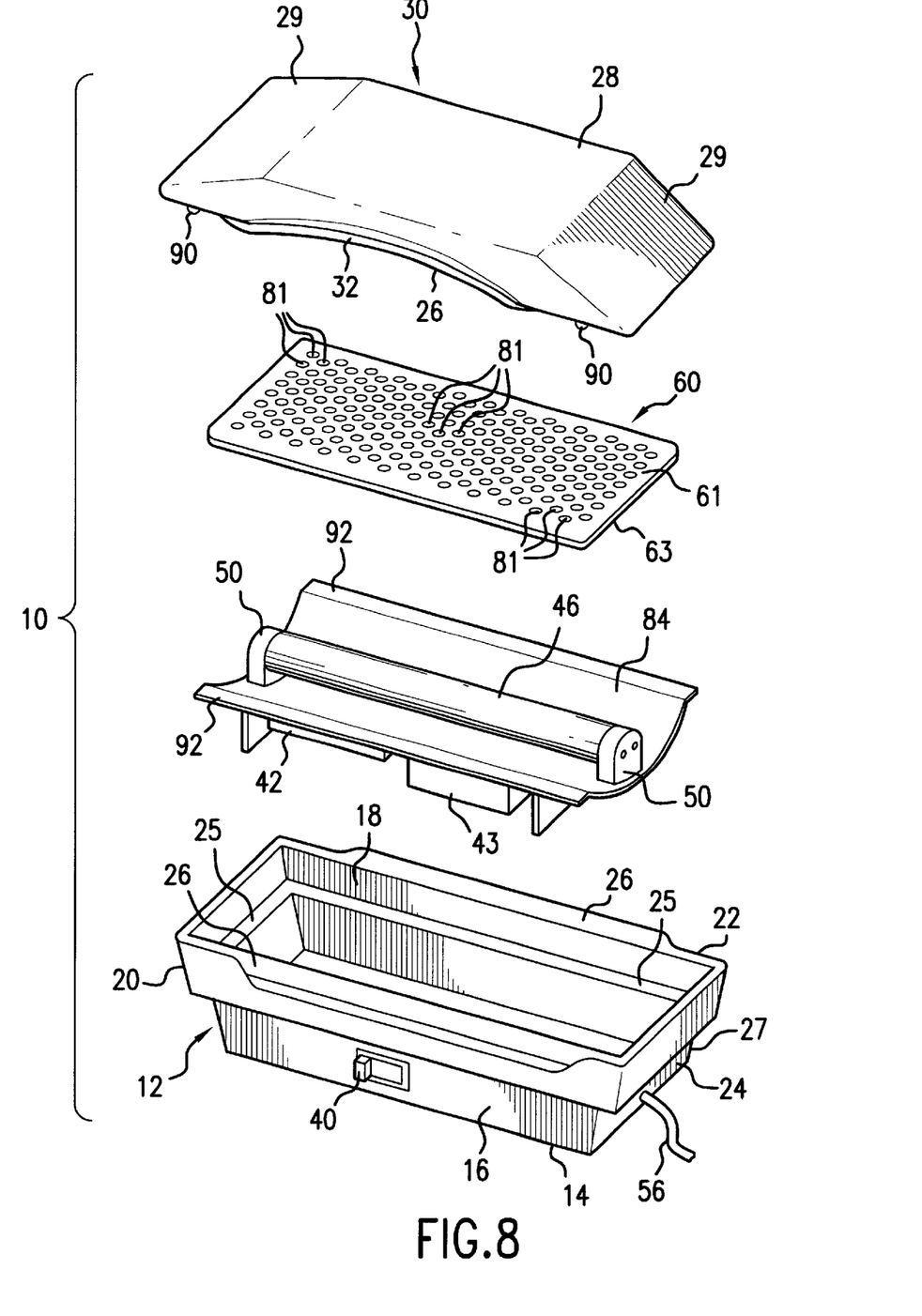
FIG. 8 is an exploded view of the component parts of this invention, showing a removable cover, with the disposable sheet, the curved reflective panel sub-assembly, and the housing.

The cover 30 may be secured in place upon the housing 12 as shown in FIG. 1 to form a disposable unit, or may alternately be configured with a removable cover 30, for ease of access within the housing 12, as shown in FIG. 8. The external lip 26 is preferably located both above and below the access aperture 32.

Alignment tabs 90 preferably extend downwardly from the cover 30 to position, align, and/or secure the cover 30 in relation to the open top side 18 of the housing 12.

A control switch 40 is preferably mounted on the housing 12. While the control switch 40 is shown in FIG. 1 to be mounted on the first side 16, it may alternately be mounted on the second side 20, the third side 22, the fourth side 24, the top side 28 or the bottom side 14, of the housing 12 to suit manufacturing preference. Alternately, the control switch 40 may be externally mounted upon the electrical cord 56 in a manner well known in the art. The control switch 40 may be a simple on, off switch as shown in FIG. 8. Preferably, the control switch 40 includes an on position; an off position; and a cyclic stop and start position.

FIG. 2 is a perspective view of the housing 12, showing an opposing ledge 25, for supporting the lower reflective panel 84 thereon. The supporting ledge 25 is positioned adjacent to the top side 28 of the housing 12, where the cover 30 is secured to the housing 25, or the supporting ledge 25 may alternately be positioned below the top side 28 of the housing 12, where the cover 30 is removable from the housing 12, as shown in FIG. 6.

Figure 3:
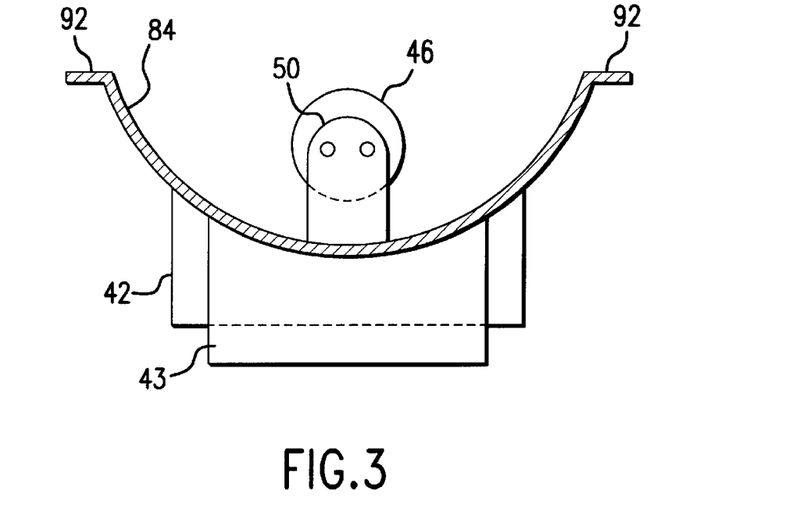
FIG. 3 is a cross sectional view of the curved reflective panel removed from the housing, with the ballast and the transformer secured beneath the curved reflective panel, and the light source positioned above the curved reflective panel.

The lower reflective panel 84 is preferably curved, as shown in FIG. 3 and FIG. 6. An electrical ballast 42 is secured beneath the lower reflective panel 84. A transformer 43 is also secured beneath the lower reflective panel 84. The electrical ballast 42 stabilizes the current flow from a remote source (not shown). The stabilized current then passes through a transformer 43 to convert the stabilized current into a desired Hertz (Hz) frequency, which is used to power the light source 46, which is secured above the reflective panel 84. Preferably, the light source 46 is a fluorescent light source. The transformer and ballast may be secured to the housing 12, or may alternately be secured beneath the lower reflective panel 84.

Preferably, the light source 46 is driven in the range of 50–60 Hz. Flying insects are attracted by the Ramen Scattering effect of the light waves, as well as from an audible sound generated by the light frequency, which are preferably selected to mimic the frequency generated by a fly's wingbeat.

Low frequencies create harmonics audible to insects, which simulate the wingbeat frequencies of the target flying insects. This enhances the attraction of the target insect species, such as flies. The fluorescent light source 46 creates flickering patterns of light and sound, which escape through the upwardly curved access aperture(s) 32, which also serve to attract flying insects.

The electrical ballast 42 and transformer 43 may be secured by any known means directly to the housing 12 beneath the disposable panel, to suit manufacturing preference.

The electrical ballast 42 and/or transformer 43 are preferably adapted to provide multiple, alternating, and/or varying frequencies. Variable frequencies provide a changing pattern of flickering light and multiple sound attractive to flying insects, such as flies. Tests have shown that flies are attracted to a wide range of frequencies, and that multiple frequencies increase their interest, resulting in more flies captured in controlled tests, in a shorter time period.

The light source 46 is preferably mounted in light sockets 50 mounted above the lower reflective panel 84 for ease of insertion, removal and replacement. The light sockets 50 are connected by insulated electrical wiring 54 to the transformer 43. The transformer is connected by insulated electrical wiring or a printed circuit board 53 to the ballast 42. The ballast 42 is in turn connected by insulated electrical wiring or a printed circuit board 52 to the control switch 40. As previously noted, the control switch 40 is connected by an insulated electrical cord 56 to an external electrical plug 58 for releasable connection to a remote electrical socket (not shown), which in turn is connected to a remote source of electrical power (also not shown), such as household current.

Figure 4A:
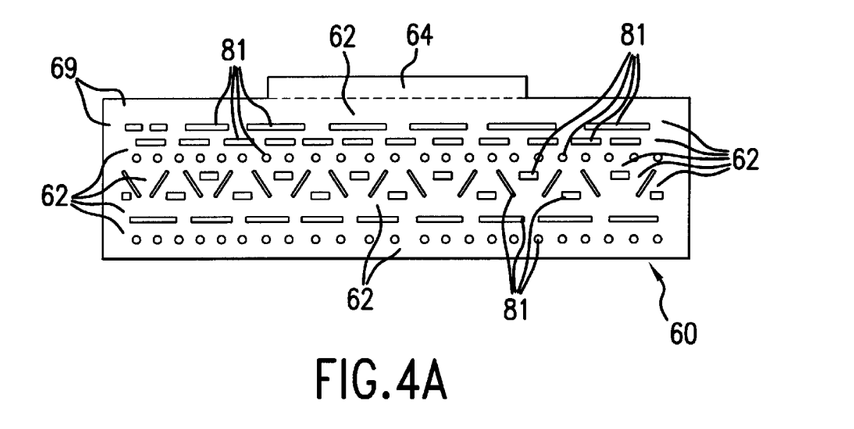
FIG. 4A is a top view of the disposable sheet having a sticky surface, with a plurality of apertures of various sizes and shapes extending therethrough. In this embodiment, the disposable sheet has a tab portion for ease of slidably positioning the disposable sheet within the access aperture located in the cover.
Figure 4B:
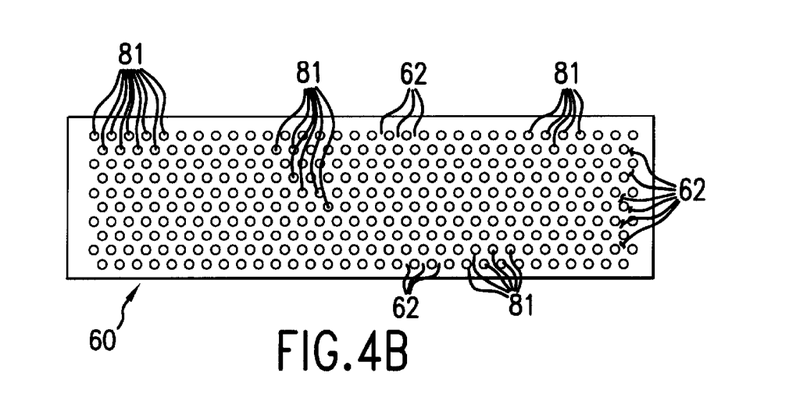
FIG. 4B is an alternate top view of the disposable sheet having a sticky upper surface, with a plurality of similar shaped apertures extending therethrough. In this embodiment, no tab is required, as the disposable sheet is installed in the housing, following removal of the cover.
Figure 4C:
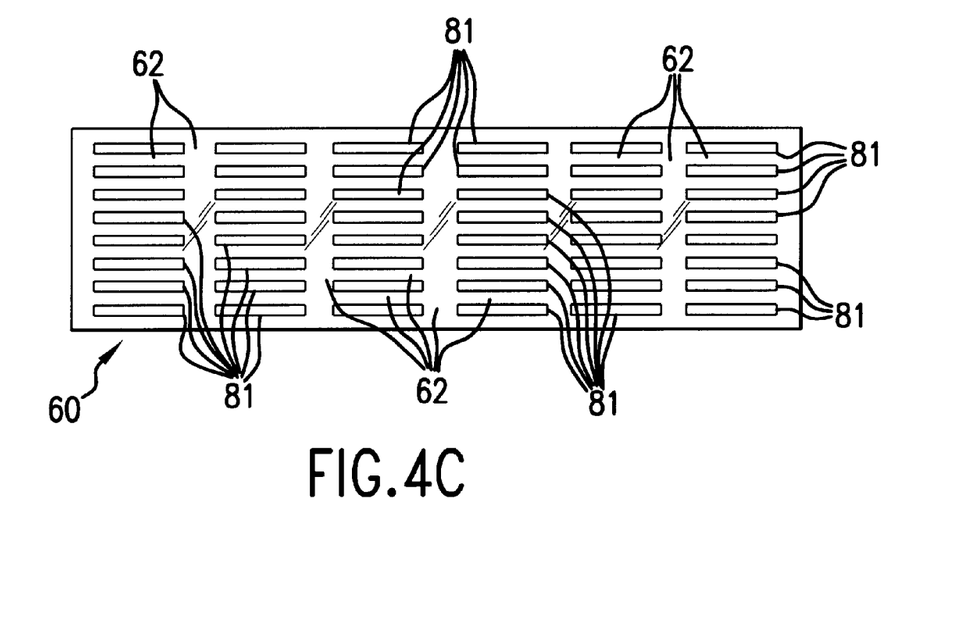
FIG. 4C is another alternate top view of the disposable sheet having a sticky upper surface, with a plurality of elongated apertures extending therethrough.

A disposable sheet 60 is positioned above the light source 46, as shown in FIG. 1 or FIG. 6. The disposable sheet 60 has a plurality of apertures 81 extending therethrough, for transmitting light and heat from the light source to the enclosed space 31 provided beneath the cover 30. Each of the plurality of apertures 81 are sized to restrict passage of flying insects, such as a fly, therethrough. FIG. 4A, FIG. 4B, and FIG. 4C show example embodiments of a plurality of alternately shaped apertures 81. The disposable sheet 60 is preferably a light transmissive thermoplastic sheet 60. Opposing sides or ends of the disposable sheet 60 are supported upon opposing ledges 25 or external lips 26 provided on opposing sides of the housing 12. Where the reflective panel 80 has opposing extensions 92 as shown in FIG. 3, the disposable sheet 60 may be slidably received upon the opposing extensions 92 of the reflective panel 84, which in turn are supported upon opposing ledges 25.

Figure 5:
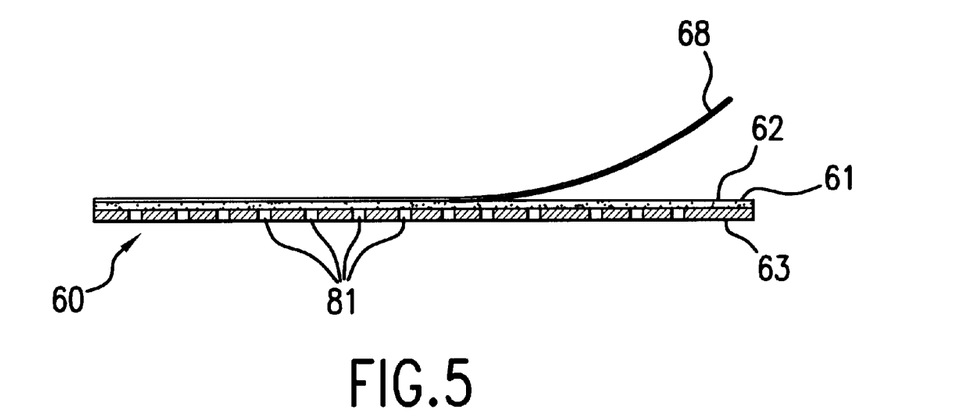
FIG. 5 is a cross sectional view of the disposable sheet shown in FIG. 4A through FIG. 4C, showing the sticky surface located above the disposable sheet, with a release paper partially attached to the sticky surface.

As best shown in FIG. 5, a sticky adhesive 62 is supplied upon the upper surface 61 of the disposable sheet 60. The plurality of apertures 81 in the disposable sheet 60 serve to provide passage of visible light and heat from the light source 46, into the space 31 provided beneath the cover 30 and above the disposable sheet 60.

The disposable sheet 60 is easily installed or removed from the housing 12 without coming in direct contact with the sticky adhesive 62, and without coming in direct contact with flies and other flying insects captured thereon. A release paper 68 is preferably placed over the sticky adhesive 62 prior to use, for ease of shipping and handling. The release paper 68 is removed during use. After use, the disposable light transmissive sheet 60 may be slidably removed from the housing 12, and discarded. A new disposable light transmissive sheet 60 is then placed within the housing 12 upon the opposing ledges 25 located above the light source 46.

A tab 64 is preferably provided to slidably position the disposable sheet 60 through an upwardly curved access aperture 32 in the cover 30, as shown in FIG. 1. The upwardly curved access aperture 32 is preferably sized to allow the disposable sheet 60 to be slidably withdrawn from the external lip 26 on the housing 12. The external lip 26 is preferably located both above and below the access aperture 32.

Where the cover 30 is removable, as shown in FIG. 8, no tab 64 is required, as the disposable sheet 60 may be placed directly upon the opposing ledges 25 located within the housing 12. In this adaptation, the opposing ledges 25 may be located in spaced relation beneath the access aperture 32, providing more room in the enclosed space 31 beneath the cover 30.

The plurality of apertures 81 in the disposable sheet 60 form primary patterns of light as the light from the light source 46 passes therethrough. As shown in FIG. 4A, FIG. 4B and FIG. 4C, the plurality of apertures 81 in the disposable sheet 60 may be provided in a plurality of shapes, sizes and patterns 65 to aid attracting flying insects. Preferably, the disposable sheet 60 is a disposable light transmissive sheet 60, which passes additional secondary light from the light source 46 into the enclosed space located beneath the cover 30. The sticky adhesive 62 located upon the upper surface 61 of the disposable light transmissive sheet 60, is preferably a light transmissive sticky adhesive 62.

Thus, primary patterns of light in the form of bright spots of light, pass through the plurality of apertures 81, while secondary light passes through the disposable light transmissive sheet 60 and through the light transmissive sticky adhesive 62. The light patterns 65 may be in the form of triangles, pyramids, octagons, zigzag patterns, elongated slots, or multi-sided shapes. The plurality of apertures 81 forming the light patterns 65 may be molded, stamped, or otherwise cut through the disposable light transmissive sheet 60.

The reflective panel 80 is positioned to extend beneath the light source 46 located within the housing 12. The reflective panel 80 is preferably curved to redirect the light from the light source 46, up through the plurality of apertures 81 in the disposable sheet 60. The redirected light passes into the enclosed space 31 provided below the cover 30, and out through the upwardly curved access aperture(s) 32 located on at least one side of the cover 30.

Preferably, the reflective panel 80 has opposing side extensions 92 sized to fit upon the opposing ledges 25 located on opposite sides 16, 22 of the housing 12.

In use, the fly trap apparatus 10 is placed in a desired location on a table, stand or countertop (not shown). An electrical plug 58 is placed into a remote electric socket (not shown), so that electric power is transferred through the electrical cord 56 to the control switch 40 mounted on the housing 12.

When the control switch 40 is actuated to an "on" position, electric power passes through the electrical wiring 52 to the ballast 42, where the electrical power is stabilized. Stabilized electrical power then passes through electrical wiring or a printed circuit board 53 from the ballast 42 to the transformer 43, where the electrical current exits at a desired frequency, over electrical wiring 54 to respective light socket(s) 50 to energize the light source 46.

The ballast 42 and/or transformer 43 may be oscillated or cycled off and on, to provide oscillating or intermittent power to the light source 46. The light source 46 is preferably a fluorescent light source 46. Primary emitted light passes through the plurality of apertures 81 in the disposable light transmissive sheet 60, while muted and diffused secondary light passes through the disposable light transmissive sheet 60 and through the light transmissive sticky adhesive 62, to the enclosed space 31 provided beneath the cover 30.

The light within the housing 12 is reflected by the lower reflective panel 84, which redirects the light through the plurality of apertures 81 in the disposable sheet 60. The light passing into the enclosed space 31 provided between the disposable sheet 60 and the cover 30, and then passes through at least one upwardly curved access aperture 32 in the cover 30, to attract flying insects in line of sight with the reflected light. The cover 30 is preferably a translucent cover 30, which provides a muted glow as the light passes through the cover 30. This muted glow attracts insects, while also serving as a night light at night or a mood light by day. The insects enter the electronic fly trap apparatus 10 through the elongated access aperture 32 into the enclosed space 31 provided between the disposable sheet 60 and the cover 30. Once inside the cover 30, they land on the sticky adhesive 62 while attracted to the source of the light 46, the heat generated by the light, and the sound produced by the frequency generated by the ballast, transformer, and the light source 46. The intensity of the primary and secondary light source 46 within the housing 12 is much greater than the light passing through the cover 30, access aperture(s) 32, and through the translucent cover 30, which further encourages the flies and other flying insects to enter into the space 31 beneath the cover 30 to seek the source of light, and the warmth generated by the light source 46.

The sticky adhesive 62 is preferably a light transmissive sticky adhesive 62. Once in contact with the sticky adhesive 62, the flies and other flying insects cannot escape. Thus, they are captured and restrained from further contact with the area surrounding the fly trap apparatus 10.

For periodic replacement of the disposable sheet 60, the switch 40 is turned off, and the disposable sheet 60 is slidably withdrawn through the access opening 32. Alternately, the cover 30 is removed, and the disposable sheet 60 may then be easily removed from the housing 12, which also removes the captured flying insects from the housing 12. The light source 46 is substantially protected from being spotted by flies as the files cannot pass through the plurality of apertures 81 in the disposable sheet 60 to come in direct contact with the light source 46.

The cover 30 may be easily cleaned with soap and water, or other conventional cleaning means. Where the cover 30 is removable, the cover 30 is removed to position a new disposable sheet 60 upon the opposing ledges 25 in the housing 12 above the light source 46. The cover 30 is then replaced upon the housing 12, the switch 40 is turned on, and the fly trap apparatus 10 is ready to resume its entrapment of flies and other flying insects from the vicinity of the fly trap apparatus 10.

Where the cover 30 is secured directly to the housing 12, the disposable sheet 60 is slidably received and removed from the housing 12 through the upwardly curved access aperture 32. In this embodiment, a tab 64 is preferably provided on the disposable sheet 60, as shown in FIG. 4A, for ease of handling the disposable sheet 60. The tab 64 is preferably not covered with sticky adhesive 62. The tab 64 may rest on a portion of the external lip 26 provided beneath the upwardly curved access aperture 32, as shown in FIG. 1.

The cover 30 may be colored or patterned to suit its surrounding decor. Where the cover 30 is removable, the cover 30 may be periodically replaced with a new cover 30 to provide a new look or new color, to change the ambiance in a room, or to conform to a change in decorator color or style.

Each disposable transparent sheet 60 is preferably sized to capture about one hundred flies and other flying insects. Once the sticky adhesive 62 is substantially full of flies, it should be replaced. The need for replacement varies by season, the ambient temperature, and the number of flies present in the vicinity of the electronic fly trap apparatus 10.

Although the invention has been described in detail in the foregoing embodiments for the purpose of illustration, it is to be understood that such detail is solely for that purpose, and that variations can be made therein by those skilled in the art without departing from the spirit and scope of the invention, except as it may be described by the following claims.

ELECTRONIC FLY TRAP APPARATUS WITH COVER

Parts List

10—electronic fly trap apparatus
12—housing
14—bottom side
16—first side
18—top side
20—second side
22—third side
24—fourth side 25—ledge(s)
26—external lip
30—cover
32—access aperture
34—indicia
40—control switch
42—electrical ballast
43—electrical transformer
46—light source
50—light socket
52—electrical wiring to ballast
53—electrical wiring from ballast to transformer
54—electrical wiring from transformer to light source
56—external electrical cord
58—external electrical plug
60—disposable sheet
61—upper surface
62—sticky adhesive
63—lower surface
64—tab on disposable sheet
65—light patterns
68—release paper
76—slots
81—plurality of apertures
84—lower reflective panel
90—alignment tabs
92—opposing side extensions

What is claimed is:

1. An electronic fly trap apparatus, comprising:
   a) a housing having a bottom, a first side, a second side, a third side, a fourth side, and a top, with an external lip provided on at least one of the sides of the housing, adjacent to the top of the housing;
   b) a cover sized to substantially cover the top of the housing, said cover having a raised top portion with spaced, depending side portions forming an enclosed space beneath the cover, at least one of the depending side portions includes an upwardly curved access aperture sized to provide access, by flying insects, into the enclosed space provided beneath the cover;
   c) an electrical ballast mounted within the housing, said ballast to stabilize the electric current passing through the ballast;
   d) an electrical transformer mounted within the housing, said transformer to convert the stabilized current from the ballast into a selected Hertz frequency;
   e) a light source located in the housing, the light source in electrical communication with said electrical transformer;
   f) a disposable sheet positioned above the light source, the disposable sheet having a plurality of apertures extending therethrough, each of the plurality of apertures sized to restrict passage of a fly therethrough, the plurality of apertures positioned on the disposable sheet to allow light and heat from the light source to pass therethrough into the enclosed space provided beneath the cover;
   g) a sticky adhesive disposed upon an upper surface of the disposable sheet;
   h) a reflective panel positioned within the housing beneath the light source to redirect light from said light source, through said plurality of apertures in said disposable sheet, into the space provided beneath the cover to attract flying insects in the vicinity of the electronic fly trap apparatus.

2. The electronic fly trap apparatus of claim 1, wherein said light source is a fluorescent light source.

3. The electronic fly trap apparatus of claim 1, wherein the disposable sheet is a disposable light transmissive sheet, and the sticky adhesive is a light transmissive sticky adhesive, and the plurality of apertures form primary patterns of light as the light passes through the plurality of apertures in the disposable sheet, and the light transmissive sheet with the light transmissive sticky adhesive thereon provides passage of secondary light from the light source into the enclosed space between the cover and the light transmissive disposable sheet.

4. The electronic fly trap apparatus of claim 1, wherein a control switch is positioned between a remote electrical source and said electrical ballast, and said control switch comprises at least two positions selected from an on position, an off position, and a cyclic stop and start position.

5. The electronic fly trap apparatus of claim 1, wherein advertising indicia is placed upon the top portion of the removable cover, and an external cover lip extends above the upwardly curved access aperture.

6. The electronic fly trap apparatus of claim 1, wherein a peelable protective sheet is sized to removably cover the sticky adhesive on the disposable sheet for ease of installation, transport and storage.

7. The electronic fly trap apparatus of claim 1, wherein the reflective panel positioned beneath the light source is downwardly curved, to better redirect light up through the apertures in the disposable sheet, and opposing side extensions on the curved reflective panel are sized to fit upon opposing ledges located on opposite sides of the sides of the housing.

8. The electronic fly trap apparatus of claim 1, wherein the cover is made of a light translucent material, so that light within the space provided beneath the translucent cover, provides a gentle glow extending through the translucent cover to attract flying insects in the vicinity of the electronic fly trap apparatus.

9. The electronic fly trap apparatus of claim 1, wherein the upwardly curved access aperture in the cover is sufficiently large to allow the disposable sheet to be slidably inserted and withdrawn from the space between the housing and the cover, without displacing flies stuck upon the sticky surface of the disposable sheet.

10. The electronic fly trap apparatus of claim 9, wherein at least one tab is provided on the disposable sheet for ease of slidably positioning the disposable sheet through the upwardly curved access aperture in the cover onto the external lip adjacent to the top of the housing.

11. The electronic fly trap apparatus of claim 1, wherein the cover is selectively removable from the housing, for ease of access into the housing.

12. An electronic fly trap apparatus, comprising:
   a) a housing having a bottom, a first side, a second side, a third side, a fourth side, and a top, with an external lip provided adjacent to one of the sides of the housing;
   b) a cover having a top portion and depending sides sized to substantially cover the top of the housing, said cover includes at least one upwardly curved access aperture positioned above the external lip on the housing, to provide access to flying insects;
   c) an electrical ballast mounted within the housing, the ballast to stabilize the electrical current from a remote electrical source;
   d) an electrical transformer mounted within the housing, the transformer to transform the stabilized electrical current from the ballast into a desired Hertz frequency;
   e) a fluorescent light source located in the housing, the light source in electrical communication with the electrical transformer;

f) a disposable sheet positioned above the fluorescent light source, the disposable sheet having a plurality of apertures extending therethrough, each aperture sized to restrict passage of a flying insect therethrough, the plurality of apertures positioned on the disposable sheet to allow light and heat from the light source to pass therethrough;

g) a sticky adhesive disposed upon an upper surface of the disposable sheet;

h) a peelable protective sheet sized to removably cover the sticky adhesive on the disposable sheet for ease of installation, transport and storage; and i) a downwardly curved reflective panel positioned within the housing beneath the light source to redirect light from the light source, out through the plurality of apertures in the disposable sheet, into a space provided between the disposable sheet and the cover.

13. The electronic fly trap apparatus of claim 12, wherein the disposable sheet is a light transmissive sheet, and the plurality of apertures in the disposable sheet are positioned to form primary patterns of light as the light passes through the plurality of apertures in the disposable sheet, and the sticky adhesive is a light transmissive sticky adhesive, and the light transmissive sheet with light transmissive sticky adhesive thereon provides passage of secondary light through the disposable light transmissive sheet and the light transmissive sticky adhesive.

14. The electronic fly trap apparatus of claim 12, wherein a control switch is positioned between the remote electrical source and said electrical ballast, and said control switch comprises at least two positions selected from an on position, an off position, and a cyclic stop and start position.

15. The electronic fly trap apparatus of claim 12, wherein advertising indicia is placed upon the top portion of the cover, and said cover is colored to suit surrounding room decor.

16. The electronic fly trap apparatus of claim 12, wherein the reflective panel has a opposing side extensions, said opposing side extensions are sized to be supported upon opposing, horizontal ledges in the housing, the light source is secured above the reflective panel, the ballast and transformer are secured beneath the reflective panel, and the disposable sheet is supported upon the opposing side extensions of the curved reflective panel.

17. The electronic fly trap apparatus of claim 12, wherein the cover is made of translucent material, so that light from the light source, provides a gentle glow extending through the cover to attract flying insects in the vicinity of the electronic fly trap apparatus.

18. An electronic fly trap apparatus, comprising:

a) a housing having a bottom, a first side, a second side, a third side and a fourth side, with external lips extending on at least two opposing sides of the sides of the housing adjacent to an open top of the housing;

b) a translucent cover having a top cover portion and depending side portions sized to substantially cover the open top of the housing, said translucent cover includes at least one upwardly curved access aperture sized to align with the external lips of the housing;

c) a downwardly curved, light reflective panel positioned within the housing;

d) an electrical ballast secured beneath the light reflective panel, the ballast to stabilize the electrical current from a remote electrical source of electrical current;

e) an electrical transformer secured beneath the light reflective panel, the transformer to transform the stabilized electrical current into a desired Hertz frequency;

f) a fluorescent light source secured above the light reflective panel, the fluorescent light source in electrical communication with the electrical transformer;

g) a disposable light transmissive sheet removably positioned upon opposing horizontal ledges positioned above the light source, the disposable light transmissive sheet having a plurality of apertures extending therethrough, each aperture sized to restrict passage of a flying insect therethrough, the plurality of apertures positioned on the disposable light transmissive sheet to allow primary patterns of light and heat from the fluorescent light source to pass therethrough, and the disposable light transmissive sheet provides passage of secondary light through the disposable light transmissive sheet;

h) a light transmissive sticky adhesive disposed upon an upper surface of the disposable light transmissive sheet;

i) a peelable sheet sized to cover the sticky adhesive on the disposable sheet for ease of installation, transport and storage, and said peelable sheet is removed prior to use in the electronic fly trap apparatus;

j) a control switch positioned between the remote electrical source and said electrical ballast, and said control switch comprises at least two positions selected from an on position, an off position and a cyclic on and off position;

wherein primary light from the fluorescent light source passes through the plurality of apertures in the disposable light transmissive sheet, and secondary light from the fluorescent light source passes through the disposable light transmissive sheet and the light transmissive sticky adhesive into a space provided between the cover and the disposable sheet, and diffused primary light and secondary light passes through the translucent cover into the surrounding environment to attract flying insects.

19. The electronic fly trap apparatus of claim 18, wherein the downwardly curved reflective panel has opposing side extensions sized to be supported upon the horizontal ledges provided on opposing sides of the sides of the housing.

20. The electronic fly trap apparatus of claim 18, wherein a tab is provided on the disposable sheet to aid in insertion and removal of the disposable sheet through the access aperture in the cover.

* * * * *